United States Patent

Zhang et al.

[11] Patent Number: 5,858,280
[45] Date of Patent: Jan. 12, 1999

[54] PREPARATION OF TRANSPARENT METHYL-MODIFIED SILICA GEL

[75] Inventors: Zuyi Zhang, Takatsuki; Yoshinori Tanigami, Nishinomiya; Ryohei Terai, Ibaraki; Hajimu Wakabayashi, Kawanishi, all of Japan

[73] Assignee: Yamamura Glass Co., Ltd., Japan

[21] Appl. No.: 703,704

[22] Filed: Aug. 27, 1996

[30] Foreign Application Priority Data

May 21, 1996 [JP] Japan .................................. 8-150359

[51] Int. Cl.$^6$ .............................. B01J 13/00; B05D 3/02; B05D 5/06
[52] U.S. Cl. .................... 252/315.2; 106/287.14; 427/164; 427/165; 427/387; 428/447; 501/12
[58] Field of Search ............................. 252/315.2, 315.6; 106/287.14; 264/212, 213; 501/12; 427/164, 165, 387; 428/447; 528/16, 17

[56] References Cited

U.S. PATENT DOCUMENTS

| 3,244,541 | 4/1966 | Fain et al. ................................. 106/13 |
| 3,310,417 | 3/1967 | Lerner et al. ...................... 106/287.14 |
| 4,170,690 | 10/1979 | Armbruster et al. .......... 106/287.14 X |
| 4,348,431 | 9/1982 | O'Malley ........................ 106/287.14 X |
| 4,472,510 | 9/1984 | January ....................................... 501/12 |
| 4,830,879 | 5/1989 | Debsikdar ........................... 427/164 X |
| 4,898,842 | 2/1990 | David .................................... 501/12 X |
| 5,049,414 | 9/1991 | Kato ......................................... 427/164 |
| 5,306,759 | 4/1994 | Sakagami et al. ...................... 524/379 |
| 5,394,269 | 2/1995 | Takamatsu et al. ................ 427/164 X |
| 5,403,368 | 4/1995 | Takahashi et al. .................... 501/12 X |
| 5,776,565 | 7/1998 | Volpe et al. ....................... 428/447 X |

*Primary Examiner*—Richard D. Lovering
*Attorney, Agent, or Firm*—Millen, White, Zelano, & Branigan, P.C.

[57] ABSTRACT

Transparent methyl-modified silica gel is produced by reacting methyltrialkoxysilane or a mixture thereof with a tetraalkoxy-, trialkoxy- or dialkoxysilane other than the methyltrialkoxysilane with a defined quantity of water at a neutral or acidic pH in the presence of a catalytically effective amount of a metal complex soluble in the methyltrialkoxysilane, and aging the resulting hydrolysate sol to form a gel. Self-sustained films of the transparent gel are produced by spreading the hydrolysate sol onto a non-adherent substrate followed by aging or drying. The gel finds use as a host material for doping optically functional molecules.

21 Claims, No Drawings

PREPARATION OF TRANSPARENT METHYL-MODIFIED SILICA GEL

BACKGROUND OF THE INVENTION

This invention relates to a method for preparing transparent methyl-modified silica gel using the sol-gel technology. Particularly, it relates to the preparation of transparent methyl-modified silica gel in bulk, film, sheet or other forms useful as a host material for optically functional organic molecules.

Glasses and ceramics produced by the sol-gel technology are susceptible to a remarkable volumetric shrinkage and therefore cracking upon drying due to the evaporation of water or alcohol contained in the gel. Several solutions are known for these problems but they are successful only with difficulties in producing transparent gel because the gel is porous in nature.

Thin films of a glass or ceramic produced by the sol-gel process may be formed on a substrate using the dip- or spin-coating method. Because the film thickness achievable by this process at one time of application is normally limited to only about 1.5 $\mu$m or less, it is imperative to repeat the coating and sintering operations when thicker films are desired. This process suffers from the problems of volumetric shrinkage and therefore generation of cracks and debonding.

JP-A-04362033 teaches a method for producing relatively thick silica gel films. The method includes the steps of spreading a solution of alkoxysilane in an organic solvent on the surface of an aqueous solution containing a base to hydrolyze and polycondensate the alkoxysilane at the interface between the aqueous phase and the organic phase, taking up the resultant film on a substrate, and heating the film at an elevated temperature. JP-A-62247834 teaches a method for producing flaky ceramic particles from a sol including the step of applying the sol on a support sheet followed by gelling. JP-A-61236620 and JP-A-62070237 disclose a method for producing silica gel film including the step of casting silica sol on the surface of a liquid having a large specific gravity such as mercury, dibromoethane or tristearin.

The films produced by these methods are also porous in nature and require a heating step at a temperature of 1,000° C. or higher to obtain a dense film, resulting in remarkable volumetric shrinkage, warps and cracks. Accordingly, it is difficult to produce a self-sustained film made of three-dimensional silica based network having a thickness from about 30$\mu$m to 200$\mu$m by the prior art methods.

It is known in the literature to synthesize silica gel doped with optically functional organic molecules by the sol-gel process. Tani et al., J. Appl. Phys., 58 (1985), 3559; and Avnir et al., J. Phy. Chem., 88 (1984), 5956. However, the gel possesses a well-developed three-dimensional network structure and the space defined by the silica network is not large enough in size to receive high concentration of organic substances having a relatively large molecular size. It has been studied to enlarge the space defined by the silica network either by introducing organic groups into the silica network or by complexing silica with an organic polymer. However, it is difficult to produce silica gel-based, shaped articles having satisfactory mechanical, optical, chemical and thermal properties.

It is known that precipitation and phase separation are often experienced in the sol-gel process due to rapid hydrolysis reaction or poor solubility of the hydrolysate. These phenomena have also been observed when preparing methyl-modified silica gel coatings. Accordingly, it is critical for the production of silica gel-based optical materials by means of sol-gel technology to inhibit the formation of precipitates and the occurrence of phase separation.

Therefore, a need exists for a method of production of transparent methyl-modified silica gel and various shaped articles made therefrom, which may eliminate or ameliorate various problems associated with the above-discussed prior art methods.

SUMMARY OF THE INVENTION

The present invention provides a method for preparing transparent methyl-modified silica gel comprising: reacting methyltrialkoxysilane with a defined quantity of water at an acidic or neutral pH in the presence of a metal complex catalyst soluble in said methyltrialkoxysilane to hydrolyze and polycondensate said methyltrialkoxysilane, and aging the resulting hydrolysate sol to form a transparent gel. The starting methyltrialkoxysilane may be a mixture with other trialkoxysilanes such as ethyltrimethoxysilane, phenyltriethoxysilane or vinyltriethoxysilane; dialkoxysilanes such as dimethyldiethoxysilane, diphenyldimethoxysilane or methylphenyldiethoxysilane; or tetraalkoxysilanes such as tetraethoxysilane or tetramethoxysilane. The alkoxy group of the starting silane compounds is preferably a lower alkoxy group such as methoxy, ethoxy, n-propoxy or iso-propoxy.

The present invention also provides a method for preparing a self-sustained film made of said methyl-modified silica gel. The method comprises additional steps of spreading said hydrolysate sol onto a nonadherent substrate to form a film prior to said aging step, and stripping off the film from the substrate.

The transparent methyl-modified silica gel produced by the above method necessarily contains a recurring unit of the formula $CH_3SiO_{1.5}$ forming a three-dimensional network structure having spaces defined in the network which are larger in size than those of unmodified silica gel. This allows to doping with a high concentration of optically functional molecules having a larger molecular size. The size and polarity of the spaces may be controlled by incorporating into the starting methyltrialkoxysilane an appropriate proportion of a di-, tri- or tetraalkoxysilane other than methyltrialkoxysilane, or an oligomer thereof.

In addition, one of significant advantages of the present invention includes the fact that neither precipitation nor phase separation occurs prior to the gelling step by virtue of the use of a metal complex catalyst. Another advantage is that the gel is less susceptible to volumetric shrinkage upon drying and there is no need for heating the gel to a high temperature such as 1,000° C. for densifying the gel.

Other advantages and objects of the present invention will become apparent to those skilled in the art as the description proceeds.

DESCRIPTION OF THE PREFERRED EMBODIMENTS

As is well-known in the art, when hydrolyzing an organodialkoxysilane, a linear or cyclic polysiloxane polymer, is obtained. In contrast, the hydrolysis of an methyltrialkoxysilane gives a polysiloxane polymer in which a unit $CH_3SiO_{1.5}$ recurs in three-dimensional directions forming a network structure. The size of space defined by the network of the resulting polysiloxane polymer is large enough to dope various optically functional substances having a relatively large molecular size in high concentrations.

In the present invention, a methyltri(lower)alkoxysilane such as methyltrimethoxysilane, methyltriethoxysilane, methyltri(n-propoxyl)silane or methyltriisopropoxysilane is used as the starting material. Depending upon intended applications, methyltrialkoxysilane may be combined with a tetraalkoxysilane such as tetramethoxysilane or tetraethoxysilane, a trialkoxysilane having a hydrocarbon group other than methyl such as ethyltrimethoxysilane, phenyltriethoxysilane or vinyltriethoxysilane, or a dialkoxysilane such as dimethyldiethoxysilane, diphenyldimethoxysilane or methylphenyldiethoxysilane in order to modify the physical properties of the gel or to control the size and polarity of spaces defined by the polysiloxane network. However, the total molar proportion of these alkoxysilanes should not exceed 80 mole % and preferably 60 mole % of the mixture.

The hydrolysis reaction is performed by adding an amount of water to the starting material. The hydrolysis reaction takes place at an acidic or neutral pH. It is preferable to conduct the hydrolysis reaction at an initial pH from 1 to 7 and more preferably from 1 to 5. To this end, an acid such as nitric, hydrochloric, acetic or other inorganic or organic acid is added to water to promote the reaction. The term "hydrolysis reaction" as used herein includes not only the hydrolysis of alkoxysilyl group to silanol group but also subsequently occurring polycondensation reactions of silanol groups together or with alkoxysilyl groups.

One of critical parameters of the hydrolysis reaction according to this invention is the amount of water relative to the starting alkoxysilane. This amount may be represented by the $H_2O/Si$ molar ratio and lies between 1.4 and 4.0, preferably between 1.4 and 2.5. With a ratio of water less than the above range, not all of the alkoxysilyl groups are hydrolyzed and, conversely, the reaction system tends to be susceptible to phase separation at a ratio of water greater than the above range. Alcohols produced by the hydrolysis reaction as by-product may be removed by placing the reaction mixture in an open system or evaporation.

Another critical parameter or condition is the addition of a metal complex soluble in methyltrialkoxysilane prior to or during the hydrolysis reaction. The complex ligands which have been found to be effective for this purpose include (a) crown ethers and (b) multidentate organic ligands capable of deprotonating upon chelating with a cation. Examples of the multidentate organic ligands include β-diketones, namely compounds having 1,3dioxopropylene group, 0,0'-azodiphenol, 0,0'-azodinaphtol, 0-salicylideneaminophenol or derivatives of the latter three. The metal species are selected such that the resulting complex has a large complex formation constant. Examples thereof include elements of group 2 through group 13 of the periodic chart of the elements and alkali metals (crown ethers). Examples of metals of group 2 through group 13 include Mg, Ce, Eu, Ti, Zr, V, Cr, Mo, Mn, Fe, Co, Rh, Ni, Cu, Zn, Al, Ga and In. Specific examples of usable metal complexes include tris (acetylacetonato)aluminum (III), tris(ethyl acetoacetato) aluminum (III), tris(diethyl malonato)aluminum (III), tris (acetylacetonato)indium (III), tris(acetylaceto-nato)gallium (III), bis(acetylacetonato) copper (II), tetrakis (acetylacetonato)zirconium (IV), tris(acetylaceto-nato) chromium (III), tris(acetylacetonato) cobalt (III), titanium (II) oxyacetylacetonate of the formula: $(CH_3COCHCOCH_3)_2TiO$, corresponding β-diketone complexes of rare earth metals, 18-crown-6 potassium complex, 12-crown-4 lithium complex, 15-crown-5 sodium complex, aluminum, cobalt, copper or titanium complex of 0, 0'-azodiphenol, o-salicylideneaminophenolatocopper (II), and o-salicylideneaminophenolatoaluminum (III). Surprisingly, the addition of the metal complex effectively inhibits the formation of crystalline precipitates and decreases the turbidity of the resultant gel. In contrast, water soluble metal complexes such as those derived from ethylenediamine or other polyamine based ligands are not usable. They may interfere with the reaction and produce precipitates by themselves during the reaction. They are generally alkaline in nature and unstable in acidic conditions under which the hydrolysis reaction of methyltrialkoxysilane is to be conducted.

The amount of the metal complex catalyst may vary within a wide range and generally ranges from 0.001 to 5, preferably from 0.01 to 1 mole % relative to the methyltrialkoxysilane. The metal complex may be produced in situ by combining the ligand and metal components.

The reaction is performed at room temperature or at an elevated temperature from 40° C. to 80° C. Since the metal complex catalyst mainly exhibits its effect upon the polycondensation stage of the reaction, it is possible to perform the hydrolysis stage of the reaction in the absence of the metal complex catalyst. Thereafter, the catalyst is added to the resultant partly hydrolyzed oligomer to complete the reaction with water. When copolymers of methyltrialkoxysilane are desired, comonomer alkoxysilanes may be added to the methyltrialkoxysilane oligomer solution containing the catalyst in the form of monomer per se or in the form of an oligomer thereof similarly prepared in the absence of the metal complex catalyst.

If desired, a metal oxide sol such as silica sol, alumina sol or zirconia sol may be added to the methyl-modified silica sol prior to gelation to improve the mechanical properties.

When allowing the reaction to proceed to the completion in a reaction vessel under open conditions, transparent methyl-modified silica gel is obtained in bulk form. When shaped articles e.g. self-sustained films are desired, the reaction product may be spread on a nonadherent substrate to form a film while the reaction product is still in a sol state followed by subjecting the sol film to gelation. A transparent self-sustained film may be obtained by stripping off the film from the substrate. Nonadherent substrates may be made of a polymeric material free from a functional group reactive with silanol group such as carbonyl, imide or cyano group, or alternatively the substrate may be made of a glass, ceramic, glass-ceramic, metal or plastic having a coating of said nonadherent organic polymer. Polyethylene, polypropylene, polystyrene, polytetrafluoroethylene, silicone or polyvinyl chloride may be mentioned as examples of the nonadherent polymeric material. The thickness of self-sustained gel films may be controlled as desired by the conventional method using an air knife, bar coater, doctor blade, metering roll, doctor roll or the like. The self-sustained films thus produced are transparent, flexible and dense and have smooth surfaces.

Self-sustained films could be produced by developing the hydrolysate sol onto a supporting aqueous solution followed by gelation.

Alternatively, a protective coating films of the methyl-modified silica gel could be formed on a substrate made of a glass, ceramic, glass-ceramic, plastic or metal material by applying the hydrolysate sol onto the substrate. The coating film is superior to the coating films of unmodified silica gel in physical and electrical properties including water resistance, impact strength and electrical insulation property, and may find use, for example, as insulating and protective coatings of alkali-containing glass substrate or as a composition for filling pits of anodized aluminum substrates used as magnetic recording media.

The self-sustained films may be subjected to a heat treatment. This treatment is effective to accelerate the polycondensation reaction of unreacted silanol groups remaining in the film to further enhance the chemical and physical properties of the film. The heat treatment is conducted preferably in the presence of a vaporized basic substance such as ammonia, methylamine, ethylamine, dimethylamine, trimethylamine, ethanolamine, diethanolamine or triethanolamine. Ammonia gas is recommended for economical reasons. The use of vaporized base is effective to accelerate the polycondensation reaction of residual silanol groups resulting in the reduction of treating temperature or reaction time. It is to be understood that the film should be subjected to the heat treatment at an elevated temperature up to 500° C. to avoid denaturing the film and also in an unsupported state so as to not restrain the film. If restrained, the film may develop cracks or warps. Where appropriate, the same treatment may be applied not only to bulk gels but also to coating films integral with a substrate.

EXAMPLES

The following Examples are offered for illustrative purposes and or not limitative purpose.

Example 1

Methyltrimethoxysilane(MTMS) sold by Shin-Etsu Chemical Co., Ltd. with a code name of LS-530 was used as the starting material. To this were added an amount of tris(acetylacetonato)aluminum (III) corresponding to 0.1 mole % of MTMS and an amount of distilled water at MTMS/$H_2O$ molar ratio of 1/1.75. 10 wt. % of the water was 0.1N $HNO_3$. The mixture initially occurred as two phases but became a homogeneous clear solution within one minute upon continued stirring at room temperature. The pH at this stage was 4.3. Then the reaction mixture was allowed to stand under closed conditions for two weeks at room temperature. Crystalline precipitates were not observed. Thereafter, the reaction mixture was kept under open conditions at 40° C. until a transparent gel was obtained.

Comparative Example 1

Example 1 was repeated without the addition of tris (acetylacetonato)aluminum (III). The mixture of MTMS and water became a homogeneous solution within one minute upon continued stirring at room temperature. When standing the solution at room temperature under closed conditions for 24 hours, crystalline precipitates were formed. The precipitates separated by centrifugation were identified as $C_8H_{24}Si_8O_{12}$ by x-ray diffraction. The supernatant of the reaction mixture gave a white turbid gel upon standing at room temperature under open conditions for two weeks.

Example 2

Step 1

Methyltriethoxysilane (MTES) sold by Shin-Etsu Chemical Co., Ltd. with a code name of LS-1890 and distilled water were mixed at an MTES/$H_2O$ molar ratio of 1/1.25. 10 wt. % of the water was 0.1N $HNO_3$. The two phase initial mixture became a homogeneous clear solution within 10 minutes upon continued stirring at room temperature. After standing under closed condition for two days at room temperature, the reaction mixture was placed in a rotary evaporator and 80 % in theory of ethanol produced by the reaction was removed from the reaction product to obtain an oligomer. This oligomer was used in this and subsequent Examples.

Step 2

Bis(acetylacetonato)copper (II) was added to the oligomer produced in Step 1 in an amount corresponding to 0.025 mole % of MTES and the mixture kept under closed condition at 50° C. for 30 minutes. After the addition of an amount of distilled water corresponding to $H_2O$/MTES molar ratio of 0.5, the oligomer was stirred under closed conditions for about 30 minutes at 50° C. whereupon a clear blue sol was obtained. Continued standing of the sol at 40° C. for two weeks under closed conditions gave a transparent blue gel. X-ray diffraction of the gel demonstrated the absence of crystals.

Comparative Example 2

To the oligomer produced in Step 1 of Example 2 was added at 50° C. a solution of copper-ethylenediamine complex, pH12, consisting of 0.1 mole % of copper sulfate, 0.2 mole % of ethylenediamine and 0.5 moles of distilled water, all calculated for MTES. The mixture remained two phases after stirring for 48 hours at 50° C. under closed conditions and the precipitates of copper complex were observed.

Comparative Example 3

To the oligomer produced in Step 1 of Example 2 were added at 50° C. 0.3 mole % of acetylacetone and 0.5 moles of distilled water, all calculated on MTES. The mixture became a clear sol after stirring at 50° C. under closed conditions for 5 minutes. Continued standing of the sol at 40° C. under closed conditions for 48 hours gave a turbid white gel.

Example 3

To the oligomer of Example 2 was added an amount of tris(acetylacetoacetonato)chromium (III) corresponding to 0.1 mole % of MTES and the mixture kept under closed conditions at 50° C. for 30 minutes. After the addition of an amount of distilled water corresponding to $H_2O$/MTES molar ratio of 0.5, the oligomer was stirred under closed conditions at 50° C. for 20 minutes whereupon a clear reddish purple sol was obtained. Continued standing of the sol at 40° C. under closed conditions for 2 days gave a transparent reddish purple gel. X-ray diffraction of the gel demonstrated the absence of crystals.

Example 4

To the oligomer of Example 2 was added an amount of tris(acetylacetonato)cobalt (III) corresponding to 0.1 mole % of MTES and the mixture kept under closed conditions at 50° C. for 30 minutes. After the addition of an amount of distilled water corresponding to $H_2O$/MTES molar ratio of 0.5, the oligomer was stirred at 50° C. under closed conditions for 20 minutes whereupon a clear green sol was obtained. Continued standing of the sol at 40° C. under closed conditions for 2 days gave a transparent green gel. X-ray diffraction of the gel demonstrated the absence of crystals.

Example 5

To the oligomer of Example 2 was added an amount of tetrakis(acetylacetonato)zirconium (IV) corresponding to 0.1 mole % of MTES and the mixture kept under closed conditions at 50° C. for 72 hours. After the addition of an amount of distilled water corresponding to $H_2O$/MTES molar ratio of 0.5, the oligomer was stirred at 50° C. under closed condition for 20 minutes whereupon a clear colorless sol was obtained. Continued standing of the sol at 40° C. under closed conditions for 2 days gave a transparent colorless gel. X-ray diffraction of the gel demonstrated the absence of crystals.

Example 6

To the oligomer of Example 2 were added an amount of aluminum sec. -butoxide corresponding to 0.1 mole % of MTES and an amount of benzoyltrifluoroacetone corresponding to 0.3 mole % of MTES and the mixture kept under closed conditions at 50° C. for 30 minutes. After the addition of an amount of distilled water corresponding to $H_2O$/MTES molar ratio of 0.5, the oligomer was stirred at 50° C. under closed conditions for 20 minutes whereupon a clear colorless sol was obtained. Continued standing of the sol at 40° C. under closed conditions for 2 days gave a transparent colorless gel. X-ray diffraction of the gel demonstrated the absence of crystals.

Example 7

To the oligomer of Example 2 were added an amount of aluminum sec. -butoxide corresponding to 0.1 mole % of MTES and an amount of 0,0'-azodiphenol at 0.1 mole % of MTES and the mixture kept under closed conditions at 50° C. for 30 minutes. After the addition of an amount of distilled water corresponding to $H_2O$/MTES molar ratio of 0.5, the oligomer was stirred at 50° C. under closed conditions for 20 minutes whereupon a clear red sol was obtained. Continued standing of the sol at 40° C. under closed conditions for 2 days gave a transparent red gel. X-ray diffraction of the gel demonstrated the absence of crystals.

Example 8

A solution containing 0.1M of aluminum sec.-butoxide and 0.1M of o-salicylideneaminophenol in toluene was prepared.

To the oligomer of Example 2 was added an amount of the solution corresponding to 0.025 mole % as aluminum of MTES and the mixture kept under closed conditions at 50° C. for 30 minutes. After the addition of an amount of distilled water corresponding to $H_2O$/MTES molar ratio of 0.5, the oligomer was stirred at 50° C. under closed conditions for 30 minutes whereupon a clear brown sol was obtained. Continued standing of the sol at 40° C. under closed conditions for 2 days gave a transparent brown gel.

Example 9

To the oligomer of Example 2 was added an amount of tris(acetylacetonato)europium (III) corresponding to 0.05 mole % of MTES and the mixture kept under closed conditions at 50° C. for 30 minutes. After the addition of an amount of distilled water corresponding to $H_2O$/MTES molar ratio of 0.5, the oligomer was stirred at 50° C. under closed conditions for 30 minutes whereupon a clear yellow sol was obtained. Continued standing of the sol at 40° C. under closed conditions for one month gave a transparent gel.

Example 10

Tetraethoxysilane(TEOS) sold by Shin-Etsu Chemical Co., Ltd. with a code name of LS-2340 was reacted with water. Distilled water was gradually added to TEOS at a $H_2O$/TEOS molar ratio of 1.5/1. 10 wt. % of the water was 0.1N $HNO_3$. Continued stirring at room temperature gave a clear solution within 30 minutes. After standing at room temperature under closed conditions for 48 hours, 60 % in theory of ethanol produced by the reaction was removed from the reaction product using an evaporator to obtain an oligomer of TEOS.

Separately, the MTES oligomer produced in Example 2 was mixed with an amount of tris(acetylacetonato) aluminum (III) corresponding to 0.1 mole % of MTES and allowed to stand at 50° C. under closed conditions for 30 minutes. To this was added an amount of distilled water corresponding to $H_2O$/MTES molar ratio of 0.5 and the mixture allowed to react at 50° C. under closed conditions for 40 minutes. The MTES oligomer was then mixed with the above TEOS oligomer at an MTES/TEOS molar ratio of 75/25. After the addition of an amount of distilled water corresponding to $H_2O$/Si molar ratio of 0.25, the oligomer mixture was allowed to react at 50 ° C. for 10 minutes under closed conditions followed by standing at 40° C. for 10 hours. A transparent colorless gel was obtained.

Example 11

Tris(acetylacetonato)aluminum (III) was added to the MTES oligomer produced in Example 2 at 0.1 mole % of MTES. After standing under closed conditions at 50° C. for 30 minutes, the oligomer was mixed with dimethyldimethoxysilane silane (DMDM) sold by Shin-Etsu Chemical Co., Ltd. with a code name of LS-520 at a DMDM/MTES molar ratio of 10/90 and further with an amount of distilled water corresponding to $H_2O$/Si molar ratio of 0.65. The oligomer mixture was then stirred under closed conditions at 50° C. for one hour followed by standing under open conditions at 40° C. for 48 hours. A transparent colorless gel was obtained.

Example 12

0.06 g of tris(acetylacetonato)aluminum (III) was dissolved in a mixture of 35.6 g of MTES and 38 g of vinyltriethoxysilane (VTES) sold by Shin-Etsu Chemical Co., Ltd. with a code name of LS-2300. Then 11 g of 0.1N nitric acid was added to the solution. The two phase mixture became a clear solution within one hour upon continued stirring under closed conditions at 40°–50° C. The solution was allowed to stand at 40 ° C. under closed conditions for 10 hours and then under open conditions in a drying chamber. A transparent gel was obtained. X-ray diffraction revealed the absence of crystals.

Example 13

Step 1

208 g of MTES was mixed with 26.28 g of 0.1M $HNO_3$ (10:90 by weight mixture of 0.1M $HNO_3$ and distilled water) and allowed to react with distilled water at room temperature under closed conditions for 48 hours with stirring. Thereafter 107 g of ethanol was distilled off from the reaction product using an evaporator to obtain an MTES oligomer solution weighing 116 g.

Step 2

The above oligomer solution was mixed with 0.37 g of tris(acetylacetonato)aluminum (III) and 10.5 g of distilled water. The mixture was stirred under closed conditions at 50 ° C. until a clear solution was obtained, and then allowed to stand at 40° C. for 22 hours. This clear solution was applied onto a polyester sheet having a silicone nonadherent coating using a doctor blade coater, and then air-dried at 80° C. for one hour. After stripping off from the polyester sheet, a transparent, self-sustained film of 150 cm×15 cm size having a thickness of 90μm was obtained. The film consists of $CH_3SiO_{1.5}$.

This film was heat treated in a silica tube furnace in an ammonia atmosphere at 200° C. for 3 hours. The absorbance at 3400 cm$^{-1}$ assigned to the silanol group in the IR spectrum of the film decreased from 3.5 to 0.7 after this heat treatment.

Example 14

151 g of TEOS was mixed with 30 g of ethanol and 19.6 g of 0.01 N nitric acid. After stirring under closed conditions at room temperature for 48 hours, 90 g of ethanol was distilled off from the resulting clear solution to obtain a TEOS oligomer solution weighting 105 g.

Separately, 41 g of the MTES oligomer solution produced as in Example 13 was mixed with 0.12 g of tris (acetylacetonato)-aluminum (III) and 3.4 g of distilled water. The mixture was stirred under closed conditions at 50° C. until a clear solution was obtained, and then allowed to stand at 50° C. for 3 hours. This solution was mixed with 14.3 g of the above TEOS oligomer solution and 1.7 g of distilled water followed by standing under closed conditions at 40° C. for 4 hours for continued reaction. The resulting solution was applied using a doctor blade coater on a polyester sheet having a silicone nonadherent coating and then air-dried at 80° C. for one hour. After stripping off from the polyester sheet, a transparent, self-sustained film of 100 cm×15 cm size having a thickness of 30 μm was obtained. The film consists of 20 mole % of $SiO_2$ and 80 mole % of $CH_3SiO_{1.5}$ This film was heat treated as in Example 13. The absorbance at 3400 cm$^{-1}$ in the IR spectrum of the film decreased from 1.2 to 0.3 after the heat treatment.

Example 15

48 g of the MTES oligomer solution produced as in Example 13 was mixed with 16.5 g of dimethyldiethoxysilane sold by Shin-Etsu Chemical Co., Ltd. with a code name of LS520, 0.12 g of tris(acetylacetonato)aluminum (III), and 3.3 g of distilled water. The mixture was stirred under closed conditions at 50° C. to make a clear solution followed by standing at 40° C. for 10 days. This solution was applied on a polyester sheet having a silicone nonadherent coating using a doctor blade coater and then air-dried at 80° C. for one hour. A transparent, self-sustained film of 50 cm×8 cm size having a thickness of 55 μm was obtained after stripping off from the polyester sheet. This film was heat treated as in Example 13. The absorbance at 3400 cm$^{-1}$ in the IR spectrum of the film decreased from 1.4 to 0.3 after the heat treatment. The film consists of 20 mole % of $(CH_3)_2SiO$ and 80 mole % of $CH_3SiO_{1.5}$.

Example 16

60.4 g of the MTES oligomer solution produced as in Example 13 was mixed with 0.17 g of tris(acetylacetonato) aluminum (III), and 5.0 g of distilled water. The mixture was stirred under closed conditions at 50° C. until a clear solution was obtained, and then allowed to stand at 40° C. for 16 hours. The solution was mixed with 83 g of ethyl silicate having a $SiO_2$ concentration of 40 wt. % and 5 g of distilled water. After standing under closed conditions at 40° C. for 5 hours, the solution was applied on a polyester sheet having a silicone nonadherent coating using a doctor blade coater, then air-dried at 80° C. for one hour. After stripping off from the polyester sheet, the film was heat treated as in Example 13. The absorbance at 3400 cm$^{-1}$ in the IR spectrum of the film decreased after the heat treatment. A transparent, self-sustained film of 30 cm×5 cm size and 200 μm thickness was obtained. This film consists of 50 mole % of $SiO_2$ and 50 mole % of $CH_3SiO_{1.5}$.

Example 17

50 g of the MTES oligomer solution produced as in Example 13 was mixed with 0.13 g of tris(acetylacetonato) aluminum (III), 5.0 g of distilled water and 68 g of dimethyldiethoxy-silane. The mixture was stirred under closed conditions at 50° C. until a clear solution was obtained, and then allowed to stand at 40° C. for two weeks. This solution was applied on a polystyrene substrate using a bar coater and air-dried at 80° C. for one hour. After stripping off from the polystyrene substrate, the resulting film having 20 cm×10 cm size and a film thickness of 100 μm was heat treated as in Example 13. The absorbance at 3400 cm$^{-1}$ in the IR spectrum of the film decreased from 1.2 to 0.2 after the heat treatment. A transparent, self-sustained film consisting of 50 mole % of $(CH_3)_2SiO$ and 50 mole % of $CH_3SiO_{1.5}$ was obtained.

Example 18

A mixture of 25 g of phenyltrimethoxysilane sold by Shin-Etsu Chemical Co., Ltd. with a code name of LS-2750 and 33.7 g of MTES was prepared. To the mixture was added 7.1 g of 0.1N nitric acid solution. The mixture was stirred under closed conditions at room temperature for 48 hours and then 25 g of alcohol produced by the reaction was removed from the reaction product using an evaporator, whereupon a clear oligomer solution weighing 37.5 g was obtained.

This oligomer solution was mixed with 0.1 g of tris (acetylacetonato)aluminum (III) and 2.6 g of distilled water. The mixture was stirred under closed conditions at 50 ° C. until a clear solution was obtained, followed by standing at 40° C. for 22 hours. This oligomer solution was applied on a polyester sheet having a silicone nonadherent coating using a doctor blade coater and then air-dried at 80 ° C. for one hour. After stripping off from the polyester sheet, the resulting film having 30 cm×10 cm size and a thickness of 80 μm was heat treated as in Example 13. The absorbance at 3400 cm$^{-1}$ in the IR spectrum of the film decreased from 3.5 to 1.0 after the heat treatment. A transparent, self-sustained film consisting of 40 mole % of $C_6H_5SiO_{1.5}$ and 60 mole % of $CH_3SiO_{1.5}$ was obtained.

We claim:

1. A method for preparing transparent methyl-modified silica gel comprising: reacting a reaction mixture comprising methyltrialkoxysilane and optionally up to 80 mole % of the entire mixture of an alkoxysilane selected from the group consisting of a tetraalkoxysilane, a trialkoxysilane other than methyltrialkoxysilane and a dialkoxysilane with water at a $H_2O/Si$ molar ratio of from 1.4 to 4.0 at a neutral or acidic pH in the presence of a catalytically effective amount of a metal complex soluble in said methyltrialkoxysilane thereby hydrolyzing and polycondensing said methyltrialkoxysilane or said mixture, and aging resulting hydrolyzate sol to form a transparent gel.

2. The method according to claim 1, wherein said methyltrialkoxysilane is methyltrimethoxysilane, methyltriethoxysilane, methyltriisopropoxysilane, methyltri (n-propoxy)silane or a mixture thereof.

3. The method according to claim 1, wherein said tetraalkoxysilane is tetramethoxysilane or tetraethoxysilane.

4. The method according to claim 1, wherein said trialkoxysilane other than methyltrialkoxysilane is ethyltrimethoxysilane, phenyltriethoxysilane or vinyltriethoxysilane.

5. The method according to claim 1, wherein said dialkoxysilane is dimethyldiethoxysilane, diphenyldimethoxysilane or methylphenyldiethoxysilone.

6. The method according to claim 1, wherein said metal complex is a complex of a metal of group 2 through 13 of the periodic chart with a β-diketone, o,o'-azodiphenol, o,o'-azodinaphthol, or o-salicylideneaminophenol compound, or a crown ether-alkali metal complex.

7. The method according to claim 1, wherein said amount of said metal complex is from 0.001 to 5 mole % relative to said methyltrialkoxysilane.

8. The method according to claim 1, wherein said metal complex is a complex of a metal of group 2 through 13 of the periodic chart with an o,o'-azodiphenol, o,o'-azodinaphthol, or o-salicylideneaminophenol compound, or a crown ether-alkali metal complex.

9. The method according to claim 1, wherein the $H_2O/Si$ molar ratio is 1.4 to 2.5.

10. The method according to claim 1, wherein the reaction mixture consists essentially of methyltrialkoxysilane, water, metal complex, optionally alkoxysilane, and optionally an acid.

11. The method according to claim 1, wherein the reaction mixture consists of methyltrialkoxysilane, water, metal complex, optionally alkoxysilane and optionally an acid.

12. A method for preparing a self-sustained film of transparent methyl-modified silica gel comprising: reacting methyltrialkoxysilane or a mixture thereof containing up to 80 mole % of the entire mixture of an alkoxysilane selected from the group consisting of a tetraalkoxysilane, a trialkoxysilane other than methyltrialkoxysilane and a dialkoxysilane with water at a $H_2O/Si$ molar ratio of from 1.4 to 4.0 at a neutral or acidic pH in the presenc of a catalytically effective amount of a metal complex soluble in said methyltrialkoxysilane to hydrolyze and polycondensate said methyltrialkoxysilane or said mixture, spreading the resulting hydrolysate sol on a nonadherent substrate to form a film, drying the film, stripping off the dried film from said substrate, and heat treating the film in the atmosphere of a gaseous base at a temperature up to 500° C.

13. The method according to claim 12, wherein said methyltrialkoxysilane is methyltrimethoxysilane, methyltriethoxysilane, methyltriisopropoxysilane, methyltri(n-propoxy)silane or a mixture thereof.

14. The method according to claim 12, wherein said tetraalkoxysilane is tetramethoxysilane or tetraethoxysilane.

15. The method according to claim 12, wherein said trialkoxysilane other than methyltrialkoxysilane is ethyltrimethoxysilane, phenyltriethoxysilane or vinyltriethoxysilane.

16. The method according to claim 12, wherein said dialkoxysilane is dimethyldiethoxysilane, diphenyldimethoxysilane or methylphenyldiethoxysilane.

17. The method according to claim 12, wherein said metal complex is a complex of a metal of group 2 through 13 of the periodic chart with a β-diketone, o,o'-azodiphenol, o,o'-azodinaphthol, o-salicylideneaminophenol compound, or a crown ether-alkali metal complex.

18. The method according to claim 12, wherein said amount of said metal complex is from 0.001 to 5 mole % relative to said methyltrialkoxysilane.

19. The method according to claim 12, wherein said nonadherent substrate is made of a polymeric nonadherent material selected from the group consisting of polyethylene, polypropylene, polystyrene, polytetrafluoroethylene, silicone and polyvinyl chloride, and materials made of a glass, ceramic, glass-ceramic, metal or plastic having a coating of said polymeric nonadherent material.

20. The method according to claim 12, wherein said metal complex is a complex of a metal of group 2 through 13 of the periodic chart with an o,o'-azodiphenol, o,o'-azodinaphthol or o-salicylideneaminophenol compound, or a crown ether-alkali metal complex.

21. The method according to claim 12, wherein the $H_2O/Si$ molar ratio is 1.4 to 2.5.

* * * * *